W. G. BEACH.
Loose Pulley Lubricator.
No. 201,487. Patented March 19, 1878.
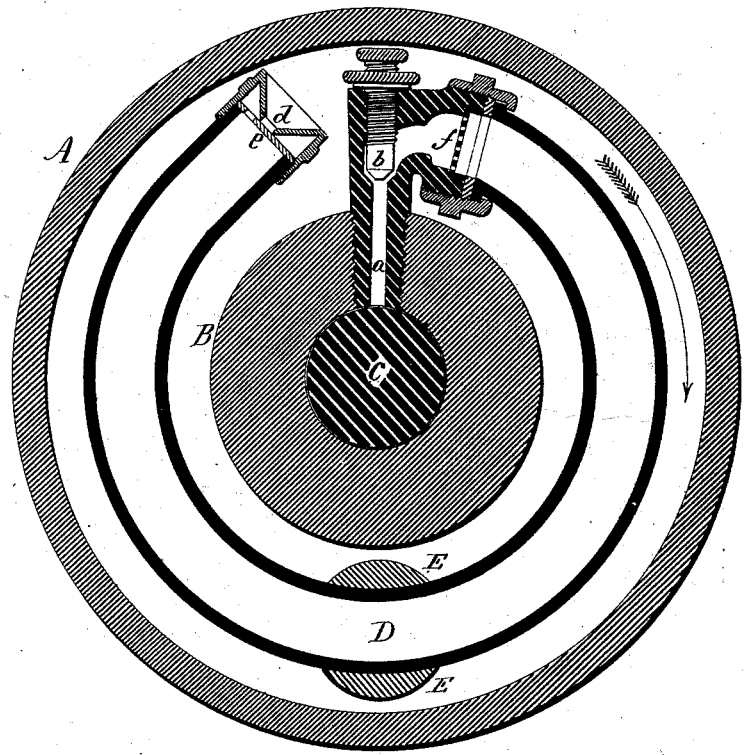

UNITED STATES PATENT OFFICE.

WILLIAM G. BEACH, OF NEW HAVEN, CONNECTICUT.

IMPROVEMENT IN LOOSE-PULLEY LUBRICATORS.

Specification forming part of Letters Patent No. 201,487, dated March 19, 1878; application filed January 24, 1878.

*To all whom it may concern:*

Be it known that I, WILLIAM G. BEACH, of New Haven, in the county of New Haven and State of Connecticut, have invented a new Improvement in Loose-Pulley Lubricator; and I do hereby declare the following, when taken in connection with the accompanying drawings and the letters of reference marked thereon, to be a full, clear, and exact description of the same, and which said drawing constitutes part of this specification, and represents a transverse section.

This invention relates to a device for lubricating loose pulleys.

Various devices have been resorted to to lubricate the bearing of loose pulleys, requiring, as they do, a large amount of lubrication, and generally inconvenient of access. None of the devices have as yet succeeded in accomplishing the desired object; but by the device hereinafter described the object is fully accomplished, and the revolution of the pulley employed in aid of the work; and it consists in a concentric tube or reservoir within the pulley, one end open to the bearing, the other to the atmosphere, and the latter in the direction in which the pulley generally revolves, with a valve arranged to automatically open by the pressure of the atmosphere, or close when revolved in the opposite direction, and so that the oil in the reservoir will be forced always toward the bearing by the pressure of the atmosphere, to which the lubricator is opened, and as more fully hereinafter described.

A represents the rim, and B the hub, of an ordinary pulley, loose upon the central shaft C. Within the pulley a concentric tube-like reservoir, D, is arranged, one end, *a*, passing through the hub, and opening to the shaft or bearing, and provided with an adjustable valve, *b*, by which the aperture may be made greater or less; the other end open to the atmosphere through an aperture, *d*, the mouth of this aperture preferably expanding in funnel shape, and on its inside a flap or easy-working valve, *e*, is arranged.

The reservoir D is filled, or partially so, with oil through the open end. The pulley revolves in the direction indicated by the arrow, or so that the mouth or aperture *d* opens in the direction of the revolution and against the atmosphere; hence the atmosphere against which the open mouth advances will enter through the aperture *d* into the reservoir, and press against the body of oil therein, forcing it toward the open end *a* and onto the bearing, thus producing a constant pressure on the oil, according to the rapidity of revolution; but to adjust the flow the valve *b* is set so as to make the discharge-aperture greater or less, according to the force or rapidity of revolution In order that the oil may not escape through the aperture *d* when the pulley is at rest, a valve, *e*, (here represented as a common flap-valve,) is arranged so that the oil flowing against it will close the valve and prevent the escape of the oil. This valve is also useful in that class of loose pulleys which sometimes run in one direction and sometimes in another, because it will open when running against the atmosphere, and thereby produce lubrication, or, in the opposite direction, prevent the escape of the oil.

In some cases it may be necessary to arrange a counter-balance opposite the discharge end, which may be done by simply loading the tube, as at E.

A strainer, *f*, is arranged near the discharge, to prevent any foreign substance from passing to the bearing with the oil.

While specially designed for loose-pulley lubrication, this lubricator is applicable to other classes of machinery in which parts revolve on a fixed bearing, and is therefore not intended to be limited to loose pulleys.

I do not broadly claim a concentric tube carrying a lubricating material and opening to the bearing of a loose pulley, as such, I am aware, is not new; but I am not aware of such a lubricating device constructed so that the force of the atmosphere, by the revolution of the pulley, is brought to bear upon the lubricating material to drive it upon the bearing.

I claim—

1. The herein-described lubricator, consisting of the concentric reservoir, open, one end to the bearing and the other to the atmosphere, the latter provided with a valve for automatically closing the aperture, and substantially as specified.

2. The concentric reservoir, open, one end to the bearing and the other to the atmosphere, the latter provided with a valve for automatically closing the aperture, and valve to adjust the flow, substantially as described.

WM. G. BEACH.

Witnesses:
JOHN E. EARLE,
H. A. KITSON.